(12) United States Patent
Kucic

(10) Patent No.: US 11,662,157 B1
(45) Date of Patent: May 30, 2023

(54) THERMAL ENERGY STORAGE TANK DIAPHRAGM SYSTEM

(71) Applicant: Joseph R. Kucic, North Aurora, IL (US)

(72) Inventor: Joseph R. Kucic, North Aurora, IL (US)

( * ) Notice: Subject to any disclaimer, the term of this patent is extended or adjusted under 35 U.S.C. 154(b) by 317 days.

(21) Appl. No.: 17/006,806

(22) Filed: Aug. 29, 2020

(51) Int. Cl.
*F28D 20/00* (2006.01)

(52) U.S. Cl.
CPC ...... *F28D 20/0039* (2013.01); *F25B 2400/24* (2013.01); *F28D 2020/0069* (2013.01); *F28D 2020/0073* (2013.01); *F28D 2020/0086* (2013.01); *F28D 2020/0091* (2013.01); *F28D 2020/0095* (2013.01)

(58) Field of Classification Search
CPC ......... F28D 20/0039; F28D 2020/0069; F28D 2020/0073; F28D 2020/0086; F28D 2020/0091; F28D 2020/0095; F25B 2400/24
USPC .............................. 60/659; 165/902, 10, 236
See application file for complete search history.

(56) References Cited

U.S. PATENT DOCUMENTS

| | | | |
|---|---|---|---|
| 3,886,961 A | 6/1975 | Geiger et al. | |
| 4,315,404 A | 2/1982 | Schmitt et al. | |
| 4,449,368 A | 5/1984 | Haynie | |
| 4,643,212 A | 2/1987 | Rothrock | |
| 4,987,922 A | 1/1991 | Andrepont | |
| 5,176,161 A | 1/1993 | Peters et al. | |
| 5,197,513 A | 3/1993 | Todd et al. | |
| 5,381,860 A | 1/1995 | Mather | |
| 5,736,059 A * | 4/1998 | Mackelvie | F24D 17/001 165/47 |
| 9,316,445 B2 | 4/2016 | Mincey | |
| 2011/0168159 A1 | 7/2011 | Lataperez et al. | |

FOREIGN PATENT DOCUMENTS

| | | | | |
|---|---|---|---|---|
| DE | 19707184 A1 | * | 8/1998 | ............ F24D 11/002 |
| DE | 102007009199 A1 | * | 9/2008 | ......... F28D 20/0039 |
| DE | 102018100539 A1 | * | 7/2018 | |
| DE | 102018100507 A1 | * | 7/2019 | |
| DE | 102018206141 A1 | * | 10/2019 | |
| EP | 0561032 A1 | * | 9/1993 | |
| EP | 2163745 A1 | * | 3/2010 | .............. F01P 11/20 |

(Continued)

*Primary Examiner* — Mickey H France
(74) *Attorney, Agent, or Firm* — Kenneth A. Roddy

(57) ABSTRACT

An enclosed storage tank for the simultaneous addition and removal, and storage, of two liquid layers of different density has a bottom wall, a cylindrical side wall, a roof, and a central column extending from the bottom wall to the roof. An upper perforated flexible tensile fabric diaphragm is disposed in the upper portion of the tank, and a low-density liquid conduit extends from outside the tank into communication with the upper portion of the tank above the upper diaphragm. A lower perforated flexible tensile fabric diaphragm is disposed in the lower part of the tank, and a high-density liquid conduit extends from outside the tank shell into communication with the lower portion of the tank below the lower liquid diaphragm. The diaphragms minimize internal mixing through thermoclines as liquid is introduced into and/or discharged from the tank, and reduce overall costs of tank installations and operations.

13 Claims, 4 Drawing Sheets

(56) References Cited

FOREIGN PATENT DOCUMENTS

| FR | 2533538 A | * | 3/1984 | ............ F24D 11/003 |
| WO | WO-0063624 A1 | * | 10/2000 | ............ F24D 3/082 |
| WO | WO-2020169153 A1 | * | 8/2020 | ........... F28D 1/0472 |

* cited by examiner

THERMAL ENERGY STORAGE TANK DIAPHRAGM SYSTEM

BACKGROUND OF THE INVENTION

1. Field of the Invention

This invention relates to apparatus and methods of storing two liquids of different densities in contact with each other in the same storage tank and the simultaneous removal of one of the liquids while the other liquid is fed into the tank. More particularly, to such tanks having an upper perforated flexible tensile fabric diaphragm disposed in the upper portion of the tank, a low-density liquid conduit extending from outside the tank into communication with the upper portion of the tank above the upper diaphragm, a lower perforated flexible tensile fabric diaphragm disposed in the lower part of the tank, and a high-density liquid conduit extending from outside the tank shell into communication with the lower portion of the tank below the lower liquid diaphragm.

2. Background Art

Thermal energy storage tanks have been used successfully throughout America for over 3 decades as a method for storing cooling capacity such as is used for air conditioning in large buildings or emergency cooling of data centers. Many occupied buildings in hot climates are in need of cooled air for comfort of the occupants and this interior air is often cooled with the use of cooling water provided by electric powered water chiller units. Historically, the water chilling units are operated simultaneous with the use of the chilled water for cooling of the building. This significantly increases the demand for production of electricity to run the water chilling units at many dispersed locations simultaneously. It has been found that the water chilling units can be used to chill the water in storage tanks in the off-peak electricity demand hours. The stored chilled water can be used for cooling of the buildings at a later time. This has permitted the shifting of the electrical power demand in a way that reduces peak power generation requirements. This reduction of the peak demand eliminates the highest cost power and provides energy storage when required. The storing of cooling capacity permits the use of renewable energy from wind and solar for use to provide cooling capacity at a later time.

A desirable feature of a storage system is to maintain separation of the two different density liquids as separate layers by stratification with the lower density liquid layer above the higher density liquid layer. Even though the density of the two liquids is different, they have the same composition. Stratification can occur because the density of the liquid increases as its temperature decreases and the density decreases as the temperature increases. Such liquids are stored in stratified layers as sources of thermal energy for heating and cooling. See for example: Schmitt et al, U.S. Pat. No. 4,315,404, Haynie, U.S. Pat. No. 4,449,368, and Rothrock U.S. Pat. No. 4,643,212.

When the lower cold layer is used for refrigeration or cooling, a stream of the cold liquid is withdrawn, used for cooling and then returned warm or hot, and at a lower density, to the top while cold liquid is simultaneously removed from the bottom layer. In this way the entire stored volume can be used for cooling so that the entire liquid content returned to the tank became heated. At an appropriate time the warm or hot liquid can be withdrawn from the tank to be cooled and then returned to the tank as a lower stratified cold layer of higher density with the hot layer of lower density on top. Cooling may continue until all of the hot liquid in the tank is withdrawn and returned as cold liquid. This functionality permits the use of intermittent power sources like solar and wind to be used when they are available to produce the desired chilled water for storage, enabling the stored chilled water to be used for air conditioning or cooling purposes at a later time.

Maintaining the desired stratification of the two liquid layers having different densities requires that the liquids be withdrawn and fed in to the tank without promoting undue mixing at the tank inlet and outlet and at the interface of the liquids. The flow velocities of the liquids inside the transfer pipes can be very high and this velocity must be reduced significantly at the interface region inside the tank. Fluid flow velocities and calculation guidelines of applicable flow constants of inlet and outlet conduits may be found in the 2016 ASHRAE Handbook, HVAC Systems and Equipment, Chapter 51 (Thermal Storage) published by The American Society of Heating, Refrigeration and Air-conditioning Engineers. The desired result can be achieved by use of manifolds, usually including a myriad of nozzles, ports, holes, slots, or other openings, but these methods and devices have been determined to be cumbersome and costly in fabrication, support, erection, maintenance, and design when the storage capacity is large or when located in seismically active regions.

Mather, U.S. Pat. No. 5,381,860 teaches a thermal energy storage system for a cool water air conditioning system that embodies the use of large diameter stainless pipe. The storage tank incorporates a water distribution system including a generally centrally positioned, vertically oriented pipe extending from a bottom of the tank to about a top of the tank. These details become very massive with larger storage tanks, excessively expensive for materials, and robust when installed in seismic locations. However, it is susceptible to sloshing water resulting from seismic events which can impart massive loads into the center column and supporting roof structure through the heavy rigid distributors.

Todd et al, U.S. Pat. No. 5,197,513 teaches a stratified chamber system for receiving, storing and dispensing two different density liquids that embodies the use of large structural diverters supported off the center column and suspended from the roof structure. These details become very massive with the larger storage tanks, excessively expensive for corrosion resistant materials, and robust when installed in seismic locations. However, it is susceptible to sloshing water resulting from seismic events which can impart massive loads into the center column and supporting roof structure through the heavy rigid distributors.

Lataperez et al, U.S. Published Patent Application 2011/0168159 teaches dual thermal energy storage tank that embodies a rigid barrier member which floats between two fluids stored at different temperatures. The high and low liquid densities vary by a fraction of a percent for water. It is extremely difficult to create a barrier container as described and to control the weight and resultant equivalent density with this precision. The rigid barrier is intended to move up and down inside the tank as the quantities of high-density and low-density liquids are changing guided by vertical columns passing through holes in the barrier and fixed to the tank. However, it is susceptible to sloshing water resulting from seismic events which can impart massive loads through the rigid barrier and vertical columns into the tank supporting roof structure.

Mincey, U.S. Pat. No. 9,316,445, teaches a thermal energy storage system that includes a thermal energy storage tank and a spider diffuser system mounted in the tank. The spider diffuser system comprises a manifold structure having an internal chamber and a plurality of diffuser legs, with each leg having a plurality of apertures along their length. These type of assemblies become very large and difficult to erect in large storage tanks in seismic areas.

Andrepont et al, U.S. Pat. No. 4,987,922 teaches a storage tank for two fluids of different densities that embodies distributors with rigid structural supports and a distributor surface of rigid plate materials. The tank has a lower liquid distribution plate which controls the distribution of higher density liquid, i.e. cold water, into and from the tank. The tank also has an upper liquid distribution plate which controls the distribution of lower density liquid i.e. hot water into and from the tank. The distributor plates are impervious to flow through the distributor surface and require liquid to travel around the distributor. These structural supports and plates are extremely heavy when installed in larger tanks and do not allow for access to all areas for initial and future painting. These large and robust distributors are also susceptible to inducing large loads into the central column and roof under seismic conditions. Also, the particular apparatus of the patent requires considerable welding and expensive fabrication.

Peters, U.S. Pat. No. 5,176,161 teaches a similar storage tank for two fluids of different densities that comprises similar heavy structural support for the distributors. The distributor material includes a plurality of side-by-side panels positioned to present a substantially horizontal, planar, flat, and smooth liquid distribution system. The plurality of removable panels provide for access to all metal areas to paint but remain difficult to install into the completed tank. These large and robust distributors are susceptical to inducing large loads into the central column and roof under seismic conditions. The panels are removable rigid beams that span between radial supports. The distributors are continuous without perforations and do not extend to the tank shell so the thermocline layer is created by fluid flow around and not through these type distributors.

One commonly used distributor system consists of large diameter pipes that are hung from the tank roof and slightly submerged under the top surface of the liquid. These pipes have hundreds of slots to allow the liquid to flow into and out of the pipes. A similar series of pipes are mounted near the bottom of the tank. These pipes are very heavy and require extensive rigging and scaffolding to install and properly align. They also impart tremendous loads through their hangers into the roof structure requiring special design for dead load and seismic loading where applicable.

All of the patents described above involve liquid distributors that are rigid structures around the center roof support column or heavy structures supported from the tank roof. During a seismic event the sloshing liquid inside the tank imparts massive loads into the rigid distributors described in these patents. The center column or tank roof would need to be designed significantly more robust to resist the seismic loads induced by the rigid distributors than would be necessary if the center column were to be designed to withstand only the normal roof loading conditions. For the major facilities where these type thermal storage tanks are now being installed the massive rigid distributors, their support structure, and the robust center columns weigh dozens of tons requiring special cranes and erection procedures that minimize damage to the paint or corrosion protection systems. This heavy erection equipment cannot access the tank interior to install the robust distributors when the tank is completed. These types of distributor systems can be built and are being built but the components for the large storage tanks in seismic regions are very large, heavy, cumbersome and challenging to erect, resulting in significant costs.

Geiger, U.S. Pat. No. 3,886,961 teaches a pre-stressed membrane building structure, and more particularly to a structural system suitable for use as temporary or permanent enclosures. Other patents directed toward tensile fabrics are known that are specifically related to coverage or weather protection related to the fabric architectural features on the exteriors of structures. However, the inventor is not aware of any patents that are directed toward the use of tensile fabrics for thermal energy storage distributors.

SUMMARY OF THE INVENTION

The present invention overcomes the aforementioned problems and is distinguished over the prior art in general, and these patents in particular by an enclosed storage tank for the simultaneous addition and removal, and storage, of two liquid layers of different density. The tank has a bottom wall, a cylindrical side wall, a roof, and a central column extending from the bottom wall to the roof. An upper perforated flexible tensile fabric diaphragm is disposed in the upper portion of the tank, and a low-density liquid conduit extends from outside the tank into communication with the upper portion of the tank above the upper diaphragm. A lower perforated flexible tensile fabric diaphragm is disposed in the lower part of the tank, and a high-density liquid conduit extends from outside the tank shell into communication with the lower portion of the tank below the lower liquid diaphragm. The diaphragms minimize internal mixing and thermoclines as liquid is introduced into and/or discharged from the tank, and reduce overall costs of tank installations and operations.

The upper perforated flexible tensile fabric diaphragm extends radially outward from the central column and defines a detention cavity between the diaphragm material and the upper liquid surface. The lower perforated flexible tensile fabric diaphragm extends radially outward from the central column and defines a detention cavity between the diaphragm material and the tank bottom surface. The upper and lower perforated flexible tensile fabric diaphragms provide reduced flow velocity and reduced mixing of the differing density liquids.

The upper and lower flexible diaphragms have numerous perforations through the tensile fabric material that allow fluid to flow through the material from the detention cavity to the main containment body of the tank interior or in the reverse direction. The size, configuration, location, and cross-sectional area of the perforations may be increased or decreased to increase or decrease the flow rate of liquid through the perforations. Thus, the turbulent flow exiting the ends of the liquid inlet and outlet conduits can be slowed as the liquid moves through the diaphragm detention cavity and changed to laminar flow through the perforations in the diaphragms by increasing the cross-sectional area of the perforations.

The upper and lower diaphragms may be formed of a single piece of perforated flexible tensile fabric material when used in smaller storage tanks or a plurality of segments that connected together to form the completed panel. This permits the installation of light weight components that can be more easily handled by workers without the need for heavy lift equipment.

The perforated flexible tensile fabric material of the upper and lower diaphragms can be pulled and tensioned appropriately to hold them in the preferred orientation to form the detention cavities.

The upper and lower diaphragms may be connected to the structural members of the tank by radial tension members such as a load restrictor or disconnect to self-release under load from their attachment points if either diaphragm is impacted by substantial loads due to the sloshing liquid that might result from a seismic event. This feature significantly reduces or eliminates any significant loading transfers into the tank roof, wall, or center column, bottom, and the diaphragms that are typical during seismic events. This feature also allows easy connectivity to return the thermal energy storage tank to original operating parameters.

The outer periphery of the upper diaphragm is releasably attached to roof nozzles located on the tank roof and can be easily assembled by workers after the tank is completed and painted. Ropes or alternate tension devices may be lowered from the top side of the roof through the roof nozzles until the lower ends can be connected to the outer periphery of the upper diaphragm. Workers on the roof can pull on the ropes from above to raise the upper diaphragm from near the bottom interior of the tank to its final elevation near the top of the tank. The periphery of the upper diaphragm can be connected to the adjustment mechanism placed in each roof nozzle so that the first diaphragm will be installed at or near its final design elevation.

The mechanism for connecting the outer periphery of the upper diaphragm to the roof nozzles permit adjustment to the diaphragm outer periphery elevation and relation to the top surface of the liquid in the tank. This can simply be described as a telescoping mechanism with an adjustment screw. The screw or nut can be turned to final adjust the elevation of the upper diaphragm and adjustment can be accomplished by a worker from the top side of the tank. The mechanism for connecting the outer periphery of the lower diaphragm to the bottom of the tank comprises lengths of chain or rod that are run through loops or other equivalent connectors and can be accessed through a worker hatch near the bottom of the tank.

Actual operating parameters of the storage system may vary due to liquid evaporation or variable flow rates. The system described herein allows easy access and adjustability of the upper diaphragm from outside the tank to meet changing operating conditions and permit operation at optimal conditions.

The upper and lower diaphragms and their suspension and tensioning members and sufficiently flexible such that they can be folded or rolled in a manner that will permit passage from the exterior of the tank shell to the interior of the tank shell through the worker access ways that are standard for these types of storage tanks. This facilitates installation of the diaphragms with standard worker tools at a time after the painting of the tank shell or for replacement at a later date.

Other differences and advantages of the invention will become apparent from time to time throughout the specification and claims as hereinafter related.

DETAILED DESCRIPTION OF THE INVENTION

Figure 1:
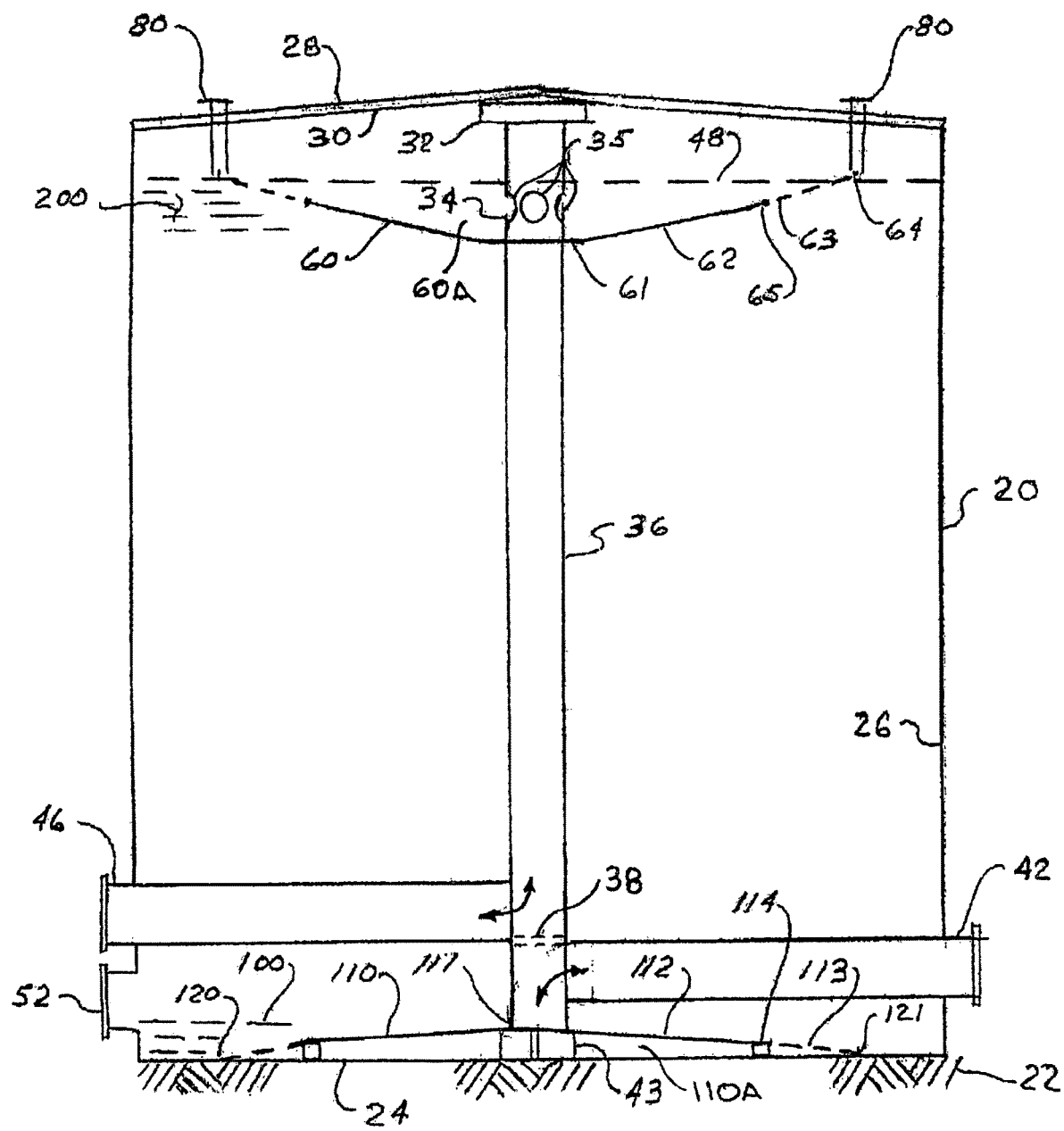
FIG. 1 is a cross sectional side elevation view of the thermal energy storage tank in accordance with the present invention showing, somewhat schematically, the upper and lower diaphragms.

To the extent that it is reasonable and practical the same or similar elements which appear in the various drawing figures will be identified by the same reference numerals.

Figure 2:
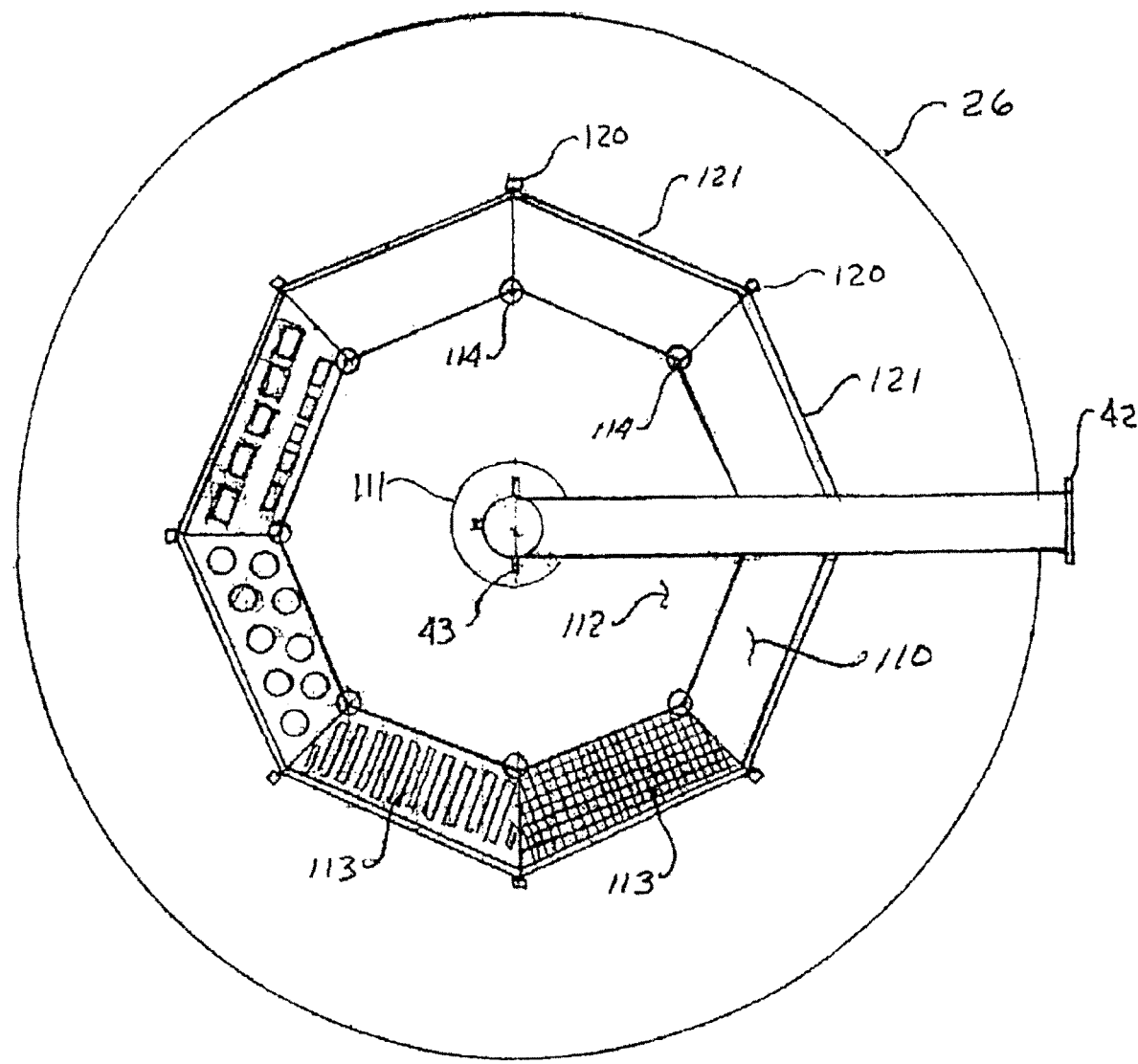
FIG. 2 is a cross sectional plan view through the thermal energy storage tank from above the lower, high-density liquid diaphragm and high-density liquid conduit.
Figure 3:
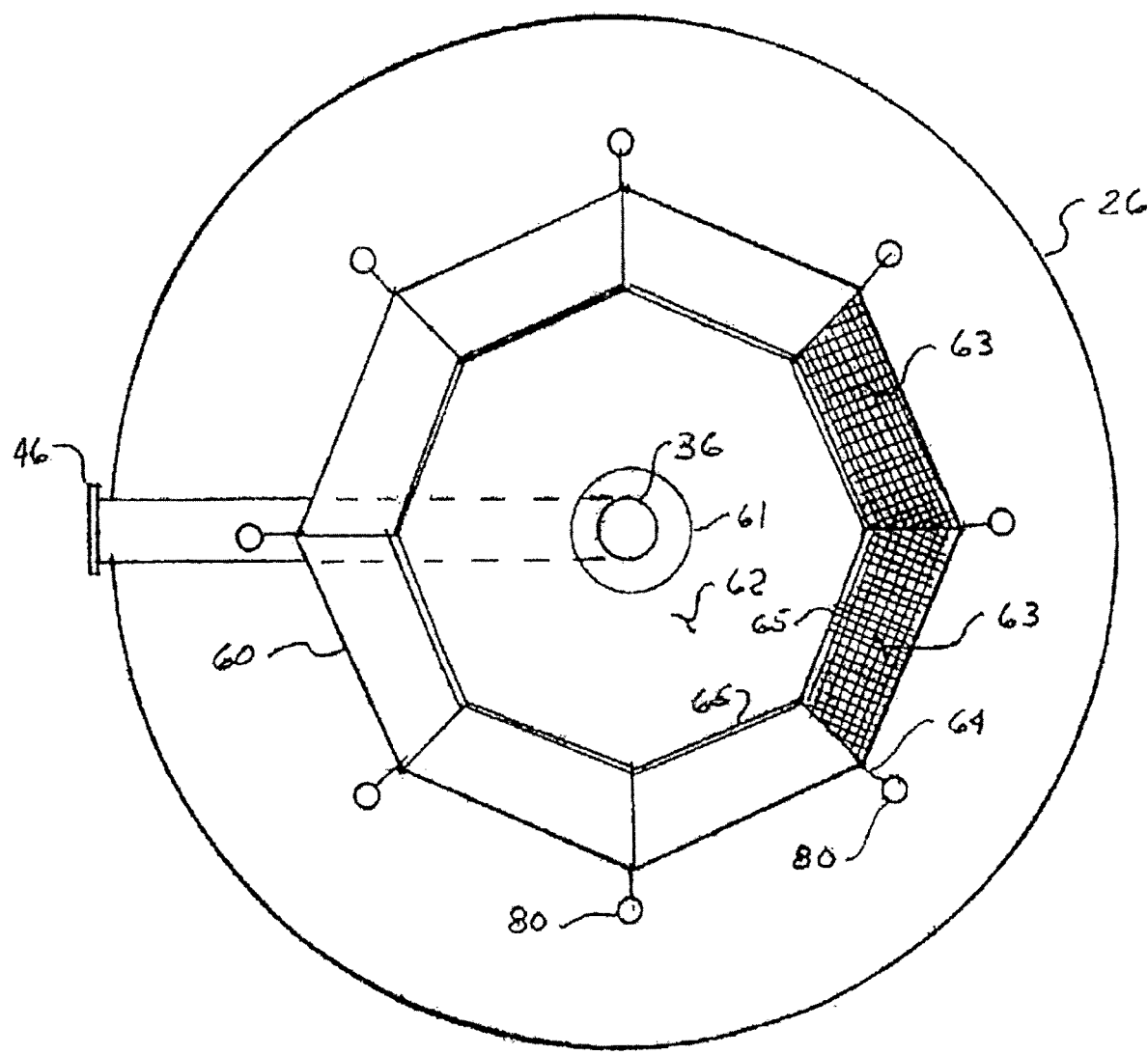
FIG. 3 is a cross sectional plan view through the thermal energy storage tank from above the upper, low-density liquid diaphragm and low-density liquid conduit.

Referring now to FIGS. 1-3 of the drawings by numerals of reference, there is shown an enclosed storage tank 20 supported on a foundation or ground surface 22. The tank 20 has a flat circular metal bottom 24, a circular cylindrical side wall 26 and a conical roof 28 which is supported by beams 30 which have inner ends supported by a column cap plate 32 on the upper end 34 of a hollow cylindrical vertical column 36 (described below). An access hatch 52 near the tank bottom 24 provides worker access into the tank and can be used to pass diaphragm parts into the tank. The storage tanks described herein are preferably constructed of concrete and will have similar but not necessarily the same exact components.

The bottom end of the hollow cylindrical vertical column 36 is supported in the center of the tank on a flow splitter device 43 mounted in the center of the tank bottom 24 and extends vertically upward from the tank bottom. The upper end 34 of the column 36 has a plurality of perforations 35 therethrough at an elevation above an upper, low-density liquid diaphragm 60 (described hereinafter). The upper, high-density liquid diaphragm assembly 60 is supported at its center around the central column 36 by a liquid restricting ring 61. The vertical column 36 and its upper end 34 may provide structural support for the roof 28 of the tank 20. A baffle plate 38 is disposed in the interior of the hollow cylindrical vertical column 36 a distance above its bottom end.

The flow splitter device 43 at the bottom end of the vertical column 36 may be a series of rectangular plates extending radially outward from a common central axis which is aligned with the central axis of the vertical column 36, somewhat similar to a cross-type vortex breaker. Optionally, the flow splitter device 43 may be a collar having a series of circumferentially spaced apertures through its sidewall attached to the bottom of the high-density liquid conduit 42.

A high-density liquid conduit 42 extends horizontally from outside of the tank side wall 26 and is adjoined to the vertical column 36 beneath the baffle plate 38 and is in liquid communication therewith and with the interior of the lower part of the tank 20 beneath and below a lower, high-density liquid diaphragm 110 (described hereinafter). The lower, high-density liquid diaphragm assembly 110 is supported at its center around the bottom end of the vertical column 36 and above the flow splitter device 43 by a liquid restricting ring 111.

High-density liquid is fed by the high-density liquid conduit 42 into the vertical column 36 beneath the baffle plate 38 and flows out the bottom end thereof through the flow splitter device 43 where the flow volume is split and exits radially outward below the lower, high-density liquid diaphragm 110 where liquid is detained and prevented from immediately flowing upwards in the tank 20 by the high-density liquid diaphragm 110.

The high-density liquid entering the tank 20 below the lower, high-density liquid diaphragm 110 must flow radially outward from the center of the tank before it can flow upward through perforations 113 in the high-density liquid diaphragm 110. The pressure in the liquid that is below the diaphragm 110 must remain relatively constant so the liquid will move upwards through all the perforations 113 at the same velocity in all locations. This forced directional flow significantly increases the cross-sectional area through which the high-density liquid must flow out of the detention volume and thereby slows the velocity and enables the stratification between the high-density and low-density liquids by facilitating establishment of a thermocline layer in the main containment body of the tank. The total area of all perforations 113 in the lower, high-density liquid diaphragm 110 can be intentionally made a multiple of the cross-sectional area of the inflow area of the high-density liquid conduit 42 and thereby slowing the flow rate by that same proportion. The same also applies to the perforations 63 in the upper diaphragm 60.

The removal of high-density liquid 100 from the tank 20 is achieved by having the liquid flow into and through a high-density liquid detention cavity 110A formed between the perforated high-density liquid diaphragm 110 and the tank bottom 24 and then into the interior of the high-density liquid conduit 42. Thus, conduit 42 functions as an inlet conduit and an outlet conduit for the high density liquid 100. The high-density fluid detention cavity 110A slows the flow velocity of the liquid into the main storage volume of the tank 20 by increased area of the perforations 113 relative to the cross-sectional area of the flow conductor 42.

A low-density liquid conduit 46 extends horizontally from the outside of the tank side wall 26 and is adjoined to the vertical column 36 above the baffle plate 38 and is in liquid communication therewith and with the interior of the upper part of the tank 20 above the upper, low-density liquid diaphragm 60. The low-density liquid conduit 46 is used to feed low-density liquid 200 into, and withdraw it from, the tank 20. When low-density liquid 200 is fed by conduit 46 into the central vertical column 36, the liquid flows upwardly inside the column until it reaches the upper portion 34 of the vertical column 36. The low-density liquid 200 then flows out of the column through a plurality of perforations 35 into the upper space of the tank but above the upper low-density liquid diaphragm 60. The low-density liquid entering the tank 20 above the diaphragm 60 must flow radially outward from the center of the tank and through a low-density liquid detention cavity 60A before it can flow downwards through perforations 63 in the upper diaphragm 60. This forced directional flow significantly increases the cross-sectional area through which the low-density liquid must flow and thereby slows the velocity and enables the stratification between the low density and high-density liquids by facilitating establishment of a thermocline layer in the main containment body of the tank 20.

There are a plurality of roof nozzles 80 that extend through the roof 28 to which the peripheral ends of the 63 upper perforated diaphragm 60 are attached to hold its shape and create the detention cavity 60A between the upper diaphragm and the upper surface 48 of the stored liquid.

To increase the volume of a higher density liquid 100, which may be cold water, in the tank 20, the higher density liquid 100 can be fed into the tank through the high-density liquid conduit 42. Simultaneously, an equal volume of the low-density liquid 200, which may be hot water, can be removed from the tank 20 through conduit 46 while the top surface 48 of the nominal maximum liquid capacity of the tank is maintained at a level above the upper low-density liquid diaphragm 60. By reversing the above described procedure the volume of low-density water 200 in the tank can be increased.

Thus, the central vertical column 36 is used as the liquid conduit for the inlet and outlet flow of low-density liquid above the upper diaphragm 60. This arrangement utilizes less material and is more economical to fabricate and erect than other designs which might be used. Another advantage of the central vertical column 36 is that it simultaneously serves to support the roof 28.

FIG. 2 illustrates, somewhat schematically, the details of the lower, high-density liquid diaphragm 110 as viewed from above. The upper, low-density liquid diaphragm 60 is a duplicate of the lower diaphragm 110 in most aspects and the description of the lower diaphragm 110 herein is intended to also apply to the upper diaphragm 60. The sizes of the storage tanks and liquid flow rates can vary considerably. The dimensions of existing tank diameters may vary from as small as twenty feet to well over one hundred feet. The size of the diaphragms can vary accordingly and the design conditions will dictate how many supports are needed.

The lower diaphragm 110 has an inner material region 112 that generally contains very few perforations. This barrier limits the immediate flow of high-density liquid in the upward direction and deflects such flow radially outward from the flow splitter device 43 at the bottom end of the central vertical column 36. The diaphragm inner material region 112 will have some perforations to allow release of air or drainage of water when the tank is filled or emptied of liquid. It may also incorporate specific weakened regions to reduce seismic loads as determined by the design and installation factors. The center region of diaphragm material 112 is supported at the designed height above the tank bottom 24 by the flow splitter device 43. The outer periphery of the diaphragm material 112 is supported off the bottom with supports 114 that are disposed on the bottom and below the material. The supports 114 preferably have the ability for adjustment in height to fix the vertical distance from the tank bottom 24 to the diaphragm material 112 as determined by the design and installation factors.

The peripheral edge of the center region of diaphragm material 112 is continuously joined to the perforated material 113. The specific size and quantity of perforation cross-sectional area that is required in this region may vary depending upon the desired slowing of the liquid velocity. For example, the perforated material 113 may be a simple mesh with the desired open area. Some liquids can develop bacterial growth that could foul the small openings in a mesh material and larger openings or perforations would be required. The perforated material of 113 may alternatively be a solid fabric with various sized and shaped holes. These can be slots, circle, squares or other various shapes and sizes to achieve the desired flow.

Connectors 120 may be provided at various locations around the periphery of the diaphragm material 113 by which the diaphragm material is attached to the tank bottom 24. The peripheral edge of the diaphragm material 113 may have weights 121 attached thereto to hold the edges of the diaphragm material in contact with the tank bottom 24. These weights 121 may be as simple as lengths of chain or rod that are run through loops or other equivalent connection means. The connection points 120 and weights 121 assure that the periphery of diaphragm material 113 is in contact with the tank bottom 24. This assures that the flow of the liquid from the detention cavity or into the detention cavity is through the perforations in the diaphragm material 113 in accordance with the design requirements.

The lower diaphragm 110 may be a single piece of material for use in smaller tanks or consist of a plurality of segments that combine to form a complete panel. The segments may also be required to accommodate internal tank components.

FIG. 3 illustrates, somewhat schematically, the details of the upper, low-density liquid diaphragm 60 as viewed from above. The upper diaphragm 60 operates much in the same way as described with the lower perforated diaphragm 110. Low density liquid enters the tank 20 through the low-density liquid conduit 46 and up the central column 36 to the upper end 34, where it exits through the perforations 35 and above the upper diaphragm 60. The central column 36 has a collar 61 disposed at a specific elevation relative to the top surface 48 of the water 48 which prevents the upper diaphragm 60 from rising above the column perforations 35. The central portion of the upper, low-density liquid diaphragm 60 is formed of flexible material 62 that is generally not perforated and directs the liquid flow radially outward. This area of flexible material 62 may have some perforations to allow the passage of air and liquid when the tank is filled or emptied of liquid. The periphery of the flexible material 62 is continuously attached to the perforated material 63 that forms the outer portion of the upper diaphragm 60.

The perforated material 63 is shown as a simple mesh. The cross-sectional area of the mesh that permits liquid flow may vary with each installation. It should be understood that the perforations could be larger slots, circles, rectangles or other various shapes and sizes. The connection between the flexible material 62 and perforated material 63 has weights 65 attached along the entire joint. These weights 65 may be as simple as lengths of chain or rod. The purpose of the weights 65 is to keep the outer edge of the flexible material 62 submerged below the surface of the water 48, as seen in FIG. 1. When liquid is removed from the top of the tank and into the central vertical column 34 the liquid flow will tend to raise the flexible diaphragm material 62 and the weights 65 will limit this movement.

The outer periphery of the flexible perforated material 63 is intended to be at or above the top of the water surface 48. This allows the diaphragm to form a detention cavity above the diaphragm. Liquid movement from the detention cavity and into the main body of the tank must therefore flow through the perforated material 63 at a flow rate as determined by design requirements. The outer periphery of the diaphragm material 63 is held at a specific design elevation and radius by pulling means 64 connected to the roof nozzles 80 that are attached into the roof 28, as described below.

Figure 4:
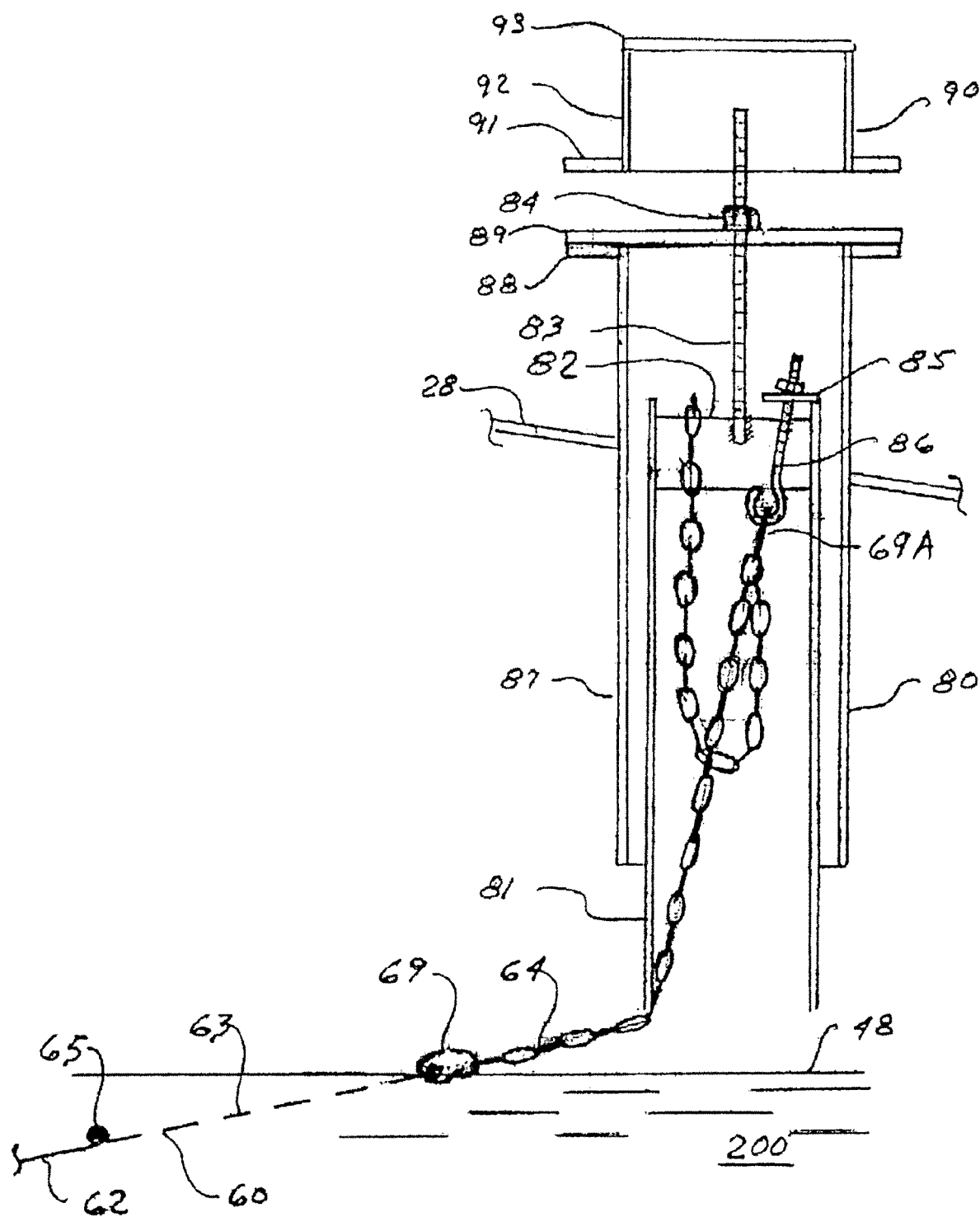
FIG. 4 is an enlarged cross sectional elevation view of the roof nozzle showing, somewhat schematically, the upper diaphragm connection and adjustment details.

FIG. 4 is a sectional elevation view that illustrates, somewhat schematically, the roof nozzles 80 and their use in fixing the placement of the outer edge of the upper, low-density liquid diaphragm 60. A number of roof nozzles 80 are installed into the tank roof 28 at locations as determined by design requirements. Each nozzle 80 is formed of a section of pipe 87 that is attached to the tank roof 28 with its opposed ends above and below the roof. The top end of the nozzle pipe 87 has a standard flange 88 and blind flange or cover plate 89. The cover plate 89 has a hole therethrough to permit axial movement of a threaded rod 83 by turning of a nut 84 engaged on the rod that is disposed above the cover plate 89. The lower end of the threaded rod 83 is connected to a plate 82 which is also connect to another smaller pipe 81 disposed in the pipe 87. Turning of the nut 84 therefore allows the internal pipe 81 to be raised or lowered from the top side of the roof 28 by a worker.

The internal pipe 81 has a small plate 85 attached where accessible near its top end. A tensioning device, such as threaded eye bolt or J-bolt 86, is placed with the threaded shank projecting through a hole in the plate 85 and secured by a nut. A pulling means, such as a chain 64 has one end attached to the outer periphery of the upper diaphragm 60 by means of a connecting device 69, which may be a simple carabiner that facilitates quick connectivity and has a specific load capacity. Other types of quick connecting devices may be used in place of the carabiner as described above. The top end of the pulling device or chain 64 can be pulled to a specified tension and the top end then connected to the J-bolt 86 where appropriate using a second quick connecting device 69A. A worker on the roof 28 can turn the nut of the J-bolt 86 to adjust the tension in the upper diaphragm 60. The details of the nozzle 80 and internal parts are designed such that the outer periphery of the upper diaphragm 60 will be at or above the top surface 48 of the liquid in the tank 20. It should be understood that all of the final dimensions are determined by engineering design calculations. The operating flow rates can vary and the elevation of the top of the liquid 48 can vary over time. The turn of the nut 84 by a worker on the roof 28 will permit raising and lowering of the outer periphery of the diaphragm material 63. Raising this material 63 will alter the cross-sectional area of the perforations below the water surface 48 and change the flow characteristics. It should be understood that a linear actuator may be substituted for the threaded rod 83 and nut 84 to permit remote adjustment when safety access to these nozzles by personnel may be limited.

A cap assembly 90 comprising a flange 91, cylindrical side wall 92, and top plate 93 may be locked into place over the nozzle 80 to prevent tampering by others.

The upper, low-density liquid diaphragm assembly 60 can be assembled near the tank bottom by workers. Ropes may dropped from the top side of the roof through the nozzles 80 and their lower ends attached to the top ends of the pulling means 64. Workers on the roof can then pull on the ropes and lift the upper diaphragm assembly 60 to the required final elevation and connect the pulling means 64 to the threaded tensioning device 86.

The present liquid distribution system is believed to be unique and final installation of the top liquid distribution system from above the tank roof, and no other liquid distribution system is known that permits future adjustment from above the tank roof. The connection method between the pulling means 64 and upper diaphragm 60, shown as a carabiner 69 for purposes of example, can have a prescribed load capacity. During seismic events the liquid sloshes across the top liquid surfaces and places tremendous loads on the present liquid distribution mechanisms and thus into the tank roof and shell. The load capacity of the connector 69 can be specified such that it would disconnect before the load would rise to a level sufficient to cause damage to the tank roof, shell, or center column. The connection device 69A at the top end of the pull device 64 would have a slightly lower load capacity than the lower connector 69. This allows the connection device 69A to fail first if the tensioning in the threaded rod 86 were too great, or during the seismic event. The connection device 69A could be easily replaced by a worker from above the roof. This is a significant advantage since many thermal energy storage tanks are specified to be used as fire water tanks after a seismic event. All other known liquid distributors are relatively heavy and transmit their additional seismic loading into the tanks.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. An enclosed storage tank for the simultaneous addition and removal, and storage, of two liquid layers of different density, comprising:
    a tank shell having a bottom wall, a side wall extending upwardly from the bottom wall, and a roof at the top end thereof supported at least in part by the side wall, and a central vertical column extending upwardly from the shell bottom wall to an upper portion of the storage tank;
    said central vertical column having a closed top end, a plurality of circumferentially spaced perforations near an upper end, an open bottom end, a baffle plate disposed a distance above the open bottom end, and a flow splitter device beneath the open bottom end;
    a high-density liquid conduit extending from outside of the tank side wall adjoined in liquid communication with interior of the vertical column beneath the baffle plate for conducting high-density liquid into and out of a lower portion of the tank interior through the open bottom end and flow splitter device;
    a lower diaphragm formed of flexible tensile fabric having a liquid restricting ring with a central opening surrounding said vertical column above the baffle plate and the open bottom end and extending radially outward and downward therefrom defining a detention cavity between the tensile fabric material and bottom wall of the tank shell configured to slow the flow velocity of high-density liquid into the tank interior and thereby enable stratification between the low-density and high-density liquids by facilitating establishment of a thermocline layer in the liquid contained in the tank;
    a low-density liquid conduit extending from outside of the tank side wall adjoined in liquid communication with interior of the vertical column above the baffle plate for conducting low-density liquid into and out of an upper portion of the tank interior through the perforations near the upper end of the vertical column; and
    an upper diaphragm formed of flexible tensile fabric having a liquid restricting ring with a central opening surrounding said vertical column beneath the perforations near the upper end of the vertical column and extending radially outward and upward therefrom defining a detention cavity between the tensile fabric and the top surface of the liquid contained in the tank configured to slow the flow velocity of the low-density liquid and thereby enable stratification between the low-density and high-density liquids by facilitating establishment of a thermocline layer in the liquid contained in the tank.

2. The enclosed storage tank according to claim 1, wherein
    the low-density liquid can be fed to into, or withdrawn from, the upper portion of the tank interior above the upper diaphragm while high-density liquid is fed into, or withdrawn from, the tank interior through the high-density liquid conduit beneath the lower diaphragm; and
    the upper diaphragm and lower diaphragm minimize internal mixing and thermoclines as liquid is introduced into and/or discharged from the tank.

3. The enclosed storage tank according to claim 1, wherein
    the flexible tensile fabric of the upper diaphragm and lower diaphragm have perforations configured various sizes, shapes, locations, and quantity, to provide selective amounts of open cross-sectional area for liquid to flow therethrough.

4. The enclosed storage tank according to claim 1, wherein
    the tank roof is provided with nozzles that extend therethrough which contain vertical adjustment devices; and
    the upper diaphragm has an outer periphery that is connected to a lower end of the vertical adjustment devices; wherein
    the vertical adjustment devices are operable to raise and lower the outer periphery and radial tension of the upper diaphragm.

5. The enclosed storage tank according to claim 4, wherein
    the vertical adjustment devices include a quick release mechanism that will release under load before the loads in the nozzles reach levels that could cause damage to the tank structure.

6. The enclosed storage tank according to claim 4, wherein
    the vertical adjustment devices are manually operable by personnel on the top side of the roof.

7. A diaphragm diffuser system for use in a thermal energy storage tank having a bottom wall, a side wall extending upwardly from the bottom wall, a roof at the top end thereof supported at least in part by the side wall, a central vertical column extending upwardly from the shell bottom wall to an upper portion of the storage tank and said central vertical column having a closed top end, a plurality of circumferentially spaced perforations near an upper end, an open bottom end, a baffle plate disposed a distance above the open bottom end, and a flow splitter device beneath the open bottom end, said diaphragm diffuser system comprising:
    a lower diaphragm formed of flexible tensile fabric having a central liquid restricting ring configured to receive and surround said vertical column above the baffle plate and the open bottom end of the central column, an outer portion extending radially outward and downward therefrom defining a detention cavity between the tensile fabric material and bottom of the tank shell configured to slow the flow velocity of high-density liquid flowing from the open bottom end of the vertical column into and out of the tank interior; and
    an upper diaphragm formed of flexible tensile fabric having a liquid restricting ring with a central opening configured to receive and surround said vertical column beneath the perforations near the upper end central vertical column, and outer portion extending radially outward and upward therefrom defining a detention cavity between the tensile fabric and the top surface of the liquid contained in the tank configured to slow the flow velocity of low-density liquid flowing into and out of the tank interior through the perforations and thereby enable stratification between the low-density and high-density liquids by facilitating establishment of a thermocline layer in the liquid contained in the tank.

8. The diaphragm diffuser system according to claim 7, wherein said outer portion of said lower diaphragm flexible tensile fabric has a plurality perforations therethrough configured and sized to slow the flow velocity of high-density liquid therethrough; and said outer portion of said upper diaphragm flexible tensile fabric has a plurality perforations therethrough configured and sized to slow the flow velocity of low-density liquid therethrough.

9. The diaphragm diffuser system according to claim 7, wherein said perforations of said outer portion of said lower diaphragm and said upper diaphragm flexible tensile fabric is selected from the group consisting of a mesh, and apertures of geometric shapes.

10. The diaphragm diffuser system according to claim 7, wherein said lower diaphragm has weights at various locations around the outer periphery of the diaphragm material by which the diaphragm is held to the bottom of the tank shell.

11. The diaphragm diffuser system according to claim 10, wherein said weights are selected from the group consisting of lengths of chain, and rods that are run through loops disposed at locations around the outer periphery of the diaphragm material.

12. The diaphragm diffuser system according to claim 7, wherein the tank roof is provided with nozzles that extend therethrough which contain vertical adjustment devices; and the outer periphery of the upper diaphragm is connected to a lower end of the vertical adjustment devices; wherein the vertical adjustment devices are operable to raise and lower the outer periphery and radial tension of the upper diaphragm.

13. The diaphragm diffuser system according to claim 12, wherein the vertical adjustment devices include quick release mechanisms that will release under load before the loads in the nozzles reach levels that could cause damage to the tank structure.

* * * * *